Dec. 9, 1952  R. W. STONE  2,620,855
VEHICLE SEAT
Filed Oct. 29, 1945
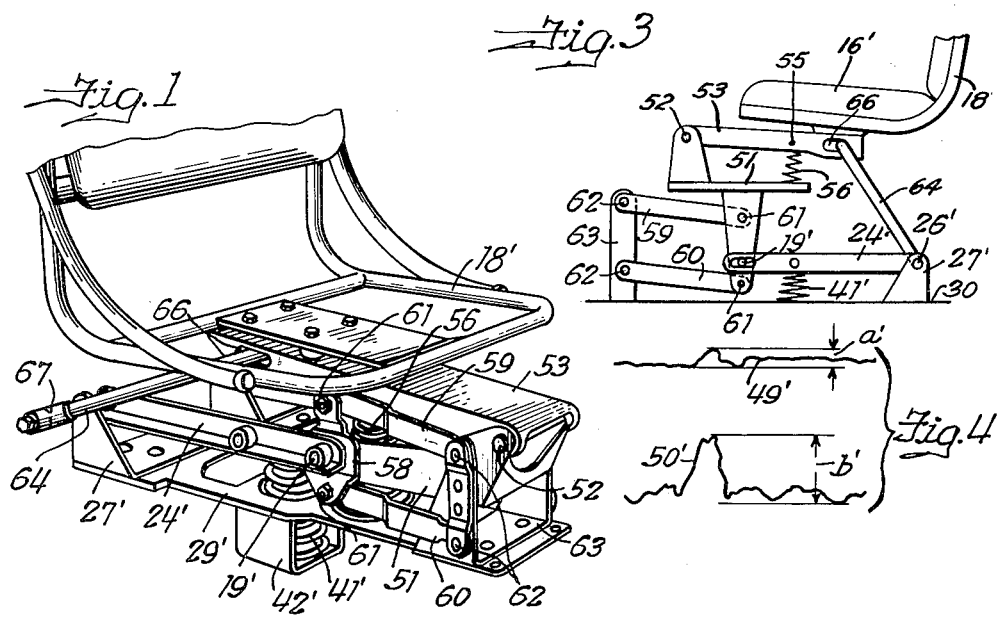
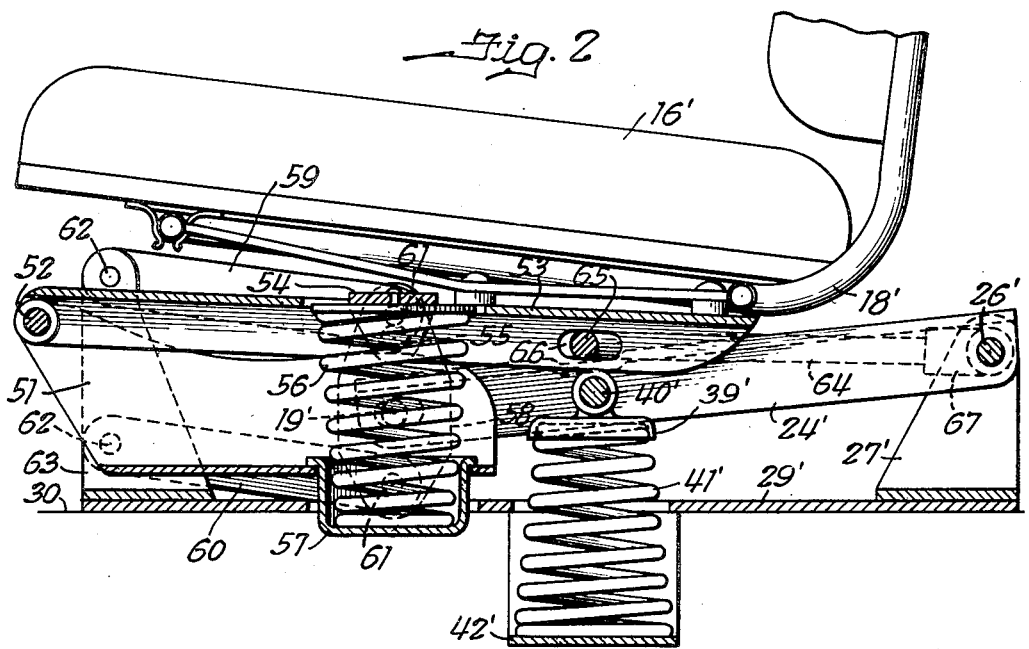
Inventor
Romaine W. Stone
Andrew F. Wintercorn
atty.

Patented Dec. 9, 1952

2,620,855

UNITED STATES PATENT OFFICE 2,620,855

VEHICLE SEAT

Romaine W. Stone, Rockford, Ill., assignor to The Atwood Vacuum Machine Company, Rockford, Ill., a copartnership Application October 29, 1945, Serial No. 625,406

16 Claims. (Cl. 155—9)

This invention relates to vehicle seats, and is more particularly concerned with improvements in the cushioning and leveling means and adjusting means for fore and aft tilting adjustments. While the seat structures herein disclosed were designed with particular reference to their use in trucks for relief from fatigue and to avoid the danger of the driver falling asleep at the wheel, it should, of course, be understood that the invention is applicable to vehicles generally, namely, automobiles, tractors, tanks, locomotives, airplanes, etc.

One of the principal objects of my invention is to provide a vehicle seat mounting of simple, economical and compact construction which involves a compounding effect insofar as the leveling action is concerned, and which reduces the up and down movement to a small fraction of that experienced by the vehicle body while in motion.

The invention is illustrated in the accompanying drawing, in which—

Fig. 1 is a perspective view of a vehicle seat made in accordance with my invention;

Fig. 2 is a longitudinal vertical section through the seat mounting;

Fig. 3 is a diagrammatic view to better illustrate the principle of compound leveling utilized in the seat shown in Figs. 1 and 2, and Fig. 4 contains two oscillograph curves showing the relative rise and fall of the seat in relation to rise and fall of the vehicle floor in motion.

The same reference numerals are applied to corresponding parts throughout the views.

In the present seat support a compound leveling action is obtained, as clearly illustrated in the diagram in Fig. 3. There are two arms or levers 24' pivoted on a cross-shaft 26' mounted in a bracket 27' carried on the main support member or base plate 29' that rests upon and is adapted to be attached to the floor 30. Between these arms 24' is pivotally supported a saddle 39' on a cross-shaft 40' supporting the arms on a conical compression spring 41' which in turn is supported on a yoke 42' attached to the base plate 29'. The arms 24' are slidably and pivotally attached at their front ends at 19' to the opposite sides of the rear end portion of a cradle member or support 51 that is pivotally connected at its front end portion by means of a cross-shaft 52 to the front end portion of a channel or seat supporting lever 53. The latter has the frame 18' of the seat 16' suitably secured thereon and has a saddle 54 pivotally mounted therein at 55 for support of the channel on an inverted conical compression spring 56. This spring is supported at the bottom in a flanged cup 57 mounted in a hole in the cradle member 51 and projecting through a hole in the base plate 29'. Brackets 58 are welded or otherwise suitably secured on opposite sides of the cradle 51 and have the rear ends of parallel arms 59 and 60 pivotally connected thereto, as indicated at 61. These arms have their front ends pivotally connected at 62 to a secondary support or yoke 63 that is suitably secured to the base plate 29'. The cradle 51, by virtue of its connections with the two pairs of seat paralleling arms 59 and 60, remains horizontal regardless of the extent of its upward and downward movement. Therefore, the channel 53, being attached at 52 to the cradle, moves up and down with the cradle, riding on the spring 56 to cushion the seat 16' attached to the channel 53.

Referring now to Fig. 4, the curve 49' is an oscillograph curve showing the up and down movement of the channel 53 and seat 16' carried thereon, and the curve 50' is an oscillograph curve showing the up and down movement of the floor. The dimension $a'$, representing the maximum vertical movement of the seat 16', is obviously much smaller than the dimension $b'$, that represents the maximum up and down movement of the floor 30. This reduction in up and down movement of the seat is due to the compound leveling action obtained with the construction of Figs. 1 and 2, as illustrated diagrammatically in Fig. 3: Point 26' moves up and down with the floor 30; point 19', as a result of the cushioning action of the spring 41', moves only a fraction of the movement of point 26'; point 52 moves to the same extent as point 19', it being a part of the same cradle 51, but the point 55 on the channel 53, to which the seat 16' is attached, moves to a still lesser degree than the points 19' and 52 as a result of the cushioning action of the spring 56. Consequently, any up and down movement of the floor 30 will result only in a doubly reduced up and down movement of the seat 16'.

In passing, attention is called to the U-shaped yoke member 64, the cross portion 65 of which is slidably pivotally mounted in slots 66 provided in the opposite side portions of the channel 53 near the rear end thereof. The arms of the yoke 64 extend rearwardly and are attached at 67 to the opposite ends of the cross-shaft 26'. This yoke 64 eliminates, or at least reduces to a minimum, side-sway of the seat 16'.

It is believed that the foregoing description conveys a good understanding of the objects and advantages of my invention. The appended claims have been drawn with a view to covering all legitimate modifications and adaptations.

I claim:

1. A device for mounting a seat on the floor of a vehicle, said device comprising a support adapted to be attached to said floor, a first set of arms, means pivotally connecting said arms each at one end thereof to said support, spring means carried by said support and connected with said arms for cushioning support thereof, a cradle pivotally supported on the other ends of said arms, a set of vertically spaced parallel arms, means pivotally connecting the arms of said second mentioned set at one end thereof to said support, means connecting the arms of said second mentioned set at the other end thereof to said cradle to guide the latter for parallel up and down movement, a seat supporting member pivoted at one end on said cradle, and a second spring means on said cradle connected with said seat supporting member and providing cushioning support therefor.

2. A device for mounting a seat as set forth in claim 1 and which further includes a generally U-shaped yoke, means pivotally connecting said yoke at one end to said support, and slidable pivot means connecting said yoke at the opposite end to said seat supporting member.

3. A device for mounting a seat as set forth in claim 2 wherein the pivot means connecting said yoke to said support are coaxial with the pivot means connecting the arms of said first set to said support.

4. A device for mounting a seat on the floor of a vehicle, said device comprising a support adapted to be attached to said floor, a first set of arms each pivotally connected at one end thereof to said support, a coiled compression spring carried by said support and engaging the intermediate portions of said arms, a cradle member pivotally supported on the other ends of said arms, a second set of vertically spaced parallel arms pivotally mounted at one end of the set on said support and extending rearwardly toward said other ends of the arms of said first set and pivotally attached to said cradle member to guide the same for parallel up and down movement, a second coiled compression spring supported on said cradle member, and an elongated seat supporting member pivoted at one end on said cradle member and resting intermediate its ends on said second spring.

5. A device for mounting a seat as set forth in claim 4 and which further includes a generally U-shaped yoke pivotally connected at the outer ends of the yoke arms on said support, the yoke arms extending forwardly and the cross portion of the yoke being slidably pivotally connected to said seat supporting member.

6. A device for mounting a seat on the floor of a vehicle, said device comprising a support adapted to be attached to said floor, substantially parallel vertically spaced arms each pivotally connected at one end thereof to said support, spring means carried by said support and engaging said arms for cushioning support thereof, a cradle supported on the other ends of said arms for parallel motion up and down, a seat supporting member pivotally mounted at one end thereof on said cradle, and a second spring means supported on said cradle and connected with said seat supporting member providing cushioning support therefor.

7. A device for mounting a seat as set forth in claim 6 and which further includes motion paralleling means pivotally connected at one end thereof to said support and slidably pivotally connected at the other end thereof to the other end of said seat supporting member.

8. A device for mounting a seat on the floor of a vehicle, said device comprising a support adapted to be attached to said floor, a first set of substantially parallel arms in spaced relation pivotally connected each at one end thereof to said support, spring means carried by said support and engaging said arms for cushioning support thereof, a cradle pivotally supported on the other ends of said arms for parallel motion up and down, a seat supporting member pivotally mounted at one end thereof on said cradle, spring means carried by said cradle and connected to, and intermediate the ends of, said seat supporting member to provide cushioned support therefor on said cradle, and a second set of arms pivotally connected each at one end thereof by stationary pivot means to said support and slidable pivot means connecting the other ends of the arms of said second set to said cradle.

9. A device for mounting a seat as set forth in claim 8 and which further includes motion paralleling means pivotally connected at one end thereof to said support and slidably and pivotally connected at the other end thereof to the other end of said seat supporting member.

10. A device for mounting a seat on the floor of a vehicle, said device comprising a support adapted to be attached to the vehicle floor, arms pivotally connected each at one end thereof to said support, a coiled compression spring carried by said support and supporting the intermediate portions of said arms thereon, a cradle member pivotally supported on the other ends of said arms, guide means connected to said cradle and permitting the same to have only substantially vertical reciprocatory movement, a second coiled compression spring supported on said cradle, and an elongated seat supporting member pivoted at one end on said cradle member and resting intermediate its ends on said second spring.

11. A device for mounting a seat as defined in claim 10 and which further includes a generally U-shaped yoke member pivotally connected at one end on said support and slidably and pivotally attached at the other end to said seat supporting member.

12. A device for mounting a seat on the floor of a vehicle, said device comprising a support adapted to be attached to the floor of a vehicle, a first set of arms pivoted at one end thereof to said support, first spring means connected with said arms for cushioning support thereof, a cradle pivotally connected on the other ends of said arms, a second set of vertically spaced parallel arms each pivoted at one end on said support and at the other end to said cradle to guide the latter for parallel up and down movement, an elongated supporting member for the seat pivoted at one end on said cradle and carrying the seat on the other end, and a second spring means on said cradle connected with said seat supporting member intermediate the ends thereof providing cushioning support therefor.

13. A device for mounting a seat as set forth in claim 12 wherein said first set of arms are elongated and said first spring means is connected with the arms of said first set intermediate the ends thereof.

14. A levelling mechanism including a support for reducing up and down movement of a seat member with respect to said support, said mechanism comprising a first lever pivotally supported at one end thereof on said support, spring cushioning means on said support engaging said lever intermediate the ends of said lever, a second lever, a support for said second lever pivotally mounted on the other end of said first lever and having said second lever pivoted at one end thereon, and a second spring cushioning means on said second lever support engaging said second lever intermediate the ends thereof, said seat member being adapted to be supported on the free end of said second lever.

15. A levelling mechanism including a main support for reducing up and down movement of a seat member with respect to said main support, said mechanism comprising a first lever pivotally mounted at one end thereof on said main support, spring cushioning means on said main support engaging said lever intermediate the ends of said lever, a second lever, a support for said second lever pivotally mounted on the other end of said first lever and having said second lever pivoted at one end thereon, a second spring cushioning means on said second lever support engaging said second lever intermediate the ends thereof, and parallel arms pivotally mounted each at one end on said main support and attached at their other ends to said second lever support to guide the latter for parallel movement, said seat member being adapted to be supported on the free end of said second lever.

16. A levelling mechanism as set forth in claim 15 and which further includes a generally U-shaped yoke pivotally mounted at one end on said main support and slidably and pivotally connected to said second lever at the other end of the yoke.

ROMAINE W. STONE.

REFERENCES CITED

The following references are of record in the file of this patent:

UNITED STATES PATENTS

| Number | Name | Date |
|---|---|---|
| 399,502 | Davis | Mar. 12, 1889 |
| 522,142 | Barrett | June 26, 1894 |
| 1,442,664 | Hansen | Jan. 16, 1923 |
| 1,857,106 | Bishop | May 3, 1932 |
| 1,863,439 | Field et al. | June 14, 1932 |
| 2,033,721 | Liron et al. | Mar. 10, 1936 |
| 2,277,875 | Macbeth | Mar. 31, 1942 |
| 2,334,922 | Gustafson | Nov. 23, 1943 |
| 2,355,762 | VanDerveer | Aug. 15, 1944 |
| 2,367,829 | Shinn | Jan. 23, 1945 |
| 2,460,596 | Roche | Feb. 1, 1949 |